US007395383B2

(12) United States Patent
McKenney

(10) Patent No.: US 7,395,383 B2
(45) Date of Patent: Jul. 1, 2008

(54) REALTIME-SAFE READ COPY UPDATE WITH PER-PROCESSOR READ/WRITE LOCKS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 11/264,580

(22) Filed: Nov. 1, 2005

(65) Prior Publication Data
US 2007/0101071 A1 May 3, 2007

(51) Int. Cl.
*G06F 12/12* (2006.01)
(52) U.S. Cl. .................. 711/152; 711/151; 711/159
(58) Field of Classification Search .............. None
See application file for complete search history.

(56) References Cited

U.S. PATENT DOCUMENTS

| | | | | |
|---|---|---|---|---|
| 5,193,162 | A | 3/1993 | Bordsen et al. | 395/425 |
| 5,442,758 | A | 8/1995 | Slingwine et al. | 707/8 |
| 5,608,893 | A | 3/1997 | Slingwine et al. | 711/141 |
| 5,727,209 | A * | 3/1998 | Slingwine et al. | 718/102 |
| 5,852,731 | A | 12/1998 | Wang et al. | 395/670 |
| 6,105,099 | A | 8/2000 | Freitas et al. | 710/200 |
| 6,189,007 | B1 | 2/2001 | Boonie et al. | 707/8 |
| 6,219,690 | B1 | 4/2001 | Slingwine et al. | 718/102 |
| 6,317,756 | B1 | 11/2001 | Kolodner et al. | 707/206 |
| 6,668,310 | B2 | 12/2003 | McKenney | 711/147 |
| 6,785,888 | B1 | 8/2004 | McKenney et al. | 718/104 |
| 2004/0054861 | A1* | 3/2004 | Harres | 711/163 |
| 2004/0107227 | A1 | 6/2004 | Michael | 707/206 |
| 2006/0242644 | A1* | 10/2006 | Blue | 718/100 |

FOREIGN PATENT DOCUMENTS

EP 1128274 A2 8/2001

OTHER PUBLICATIONS

J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions On Parallel And Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.

(Continued)

*Primary Examiner*—Than Nguyen
(74) *Attorney, Agent, or Firm*—Walter W. Duft; Abdy Raissinia

(57) ABSTRACT

A technique for realtime-safe detection of a grace period for deferring the destruction of a shared data element until pre-existing references to the data element have been removed. A per-processor read/write lock is established for each of one or more processors. When reading a shared data element at a processor, the processor's read/write lock is acquired for reading, the shared data element is referenced, and the read/write lock that was acquired for reading is released. When starting a new grace period, all of the read/write locks are acquired for writing, a new grace period is started, and all of the read/write locks are released.

7 Claims, 7 Drawing Sheets

OTHER PUBLICATIONS

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

B. Gamsa, "Tornado: Maximizing Locality and Concurrency in a Shared Memory Multiprocessor Operating System," 1999, 14 pages.

Ben Gamsa et al., "Tornado: Maximizing Locality and Concurrency in a Shared Memory Multiprocessor Operating System" (1999).

Paul E. McKenney et al., "Read Copy Update", Ottawa Linux Symposium (2002), pp. 338-367.

H. S. Stone et al., "Scheme for Controlling Concurrent Algorithms that Update Linked Data Structures", IBM Technical Disclosure Bulletin v. 36 n. 10 (Oct. 1993), pp. 437-440.

* cited by examiner

REALTIME-SAFE READ COPY UPDATE WITH PER-PROCESSOR READ/WRITE LOCKS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring."

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a "callback") with a read-copy update subsystem so that it can be executed at the end of the grace period.

The read-copy update subsystem keeps track of pending callbacks for each processor and monitors per-processor quiescent state activity in order to detect when each processor's current grace period has expired. As each grace period expires, all scheduled callbacks that are ripe for processing are executed.

Conventional grace period processing faces challenges in a preemptive realtime computing environment because a context switch does not always guarantee that a grace period will have expired. In a preemptive realtime computing system, a reader holding a data reference can be preempted by a higher priority process. Such preemption represents a context switch, but can occur without the usual housekeeping associated with a non-preemptive context switch, such as allowing the existing process to exit a critical section and remove references to shared data. It therefore cannot be assumed that a referenced data object is safe to remove merely because all readers have passed through a context switch. If a reader has been preempted by a higher priority process, the reader may still be in a critical section and require that previously-obtained data references be valid when processor control is returned.

It is to solving the foregoing problems that the present invention is directed. In particular, what is required is a read-copy update grace period detection technique that may be safely used in a preemptive realtime computing environment.

SUMMARY OF THE INVENTION

The foregoing problems are solved and an advance in the art is obtained by a method, system and computer program product for implementing realtime-safe detection of a grace period for deferring the destruction of a shared data element until pre-existing references to the data element are removed. According to the inventive technique, a per-processor read/write lock is established for each of one or more processors. When reading a shared data element at a processor, the processor's read/write lock is acquired for reading, the shared data element is referenced, and the read/write lock that was acquired for reading is released. When starting a new grace period, all of the read/write locks must be acquired for writing, then released after the new grace period is initiated.

Periodically, a shared data element is updated in a manner that preserves a pre-update version of the data element and a new request is made for deferred destruction of the data element. In accordance with an exemplary embodiment of the invention, a test is made for the start of a new grace period. If a new grace period has started, previous requests for deferred data element destruction are advanced to a current generation queue. The new request for deferred destruction is placed on a next generation queue. All shared data elements on the current generation queue may be processed for destruction after starting the new grace period.

When reading a shared data element in an exemplary embodiment of the invention, the reading can be performed by an executable task having an associated task structure that maintains a reference to the read/write lock that was acquired for reading (even if preemption results in the reader being moved to a different processor) until release thereof. If the reading is a recursive read operation, acquisition of the read/write lock for reading need not be performed. The reading may further comprise disabling preemption and/or hardware interrupts when acquiring and releasing the read/write lock. The rate of acquisition of the read/write locks for writing and grace period control can be determined according to memory availability or other factors.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1A:
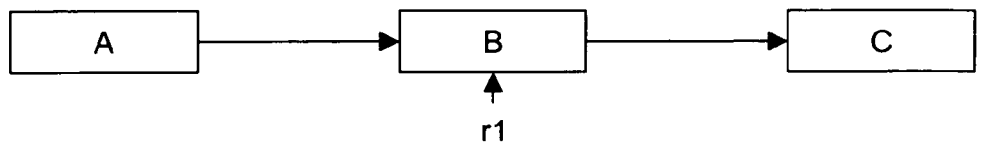
FIGS. 1A-1D are diagrammatic representations of a linked list of data elements undergoing a data element replacement according to a conventional read-copy update mechanism.
Figure 1B:
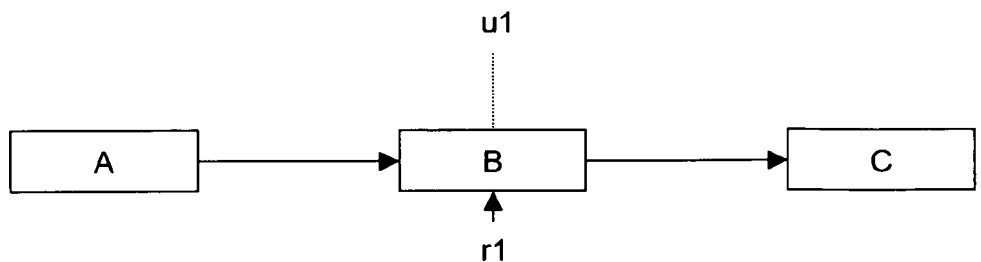
Figure 1C:
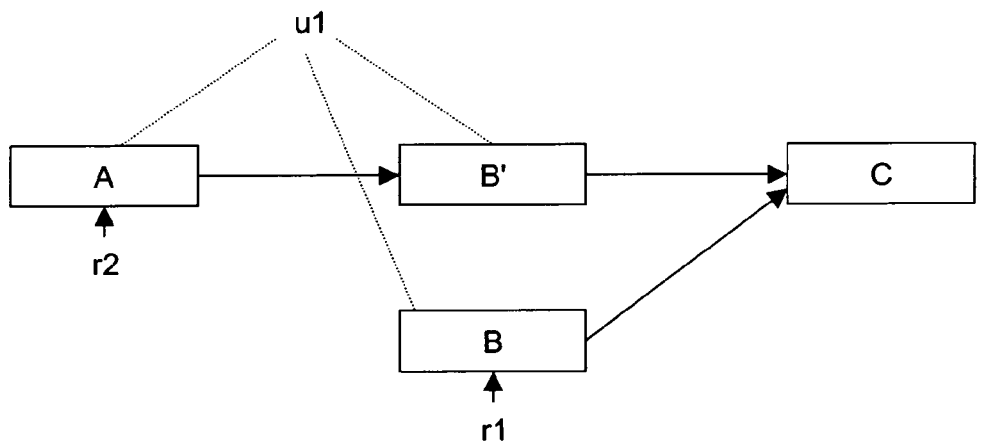
Figure 1D:
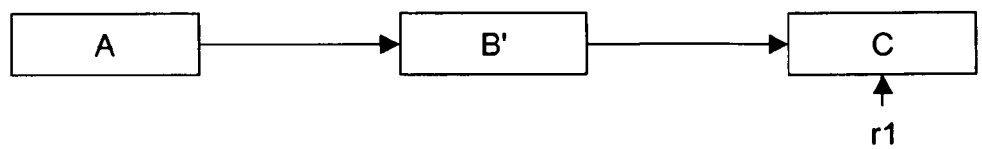
Figure 2A:
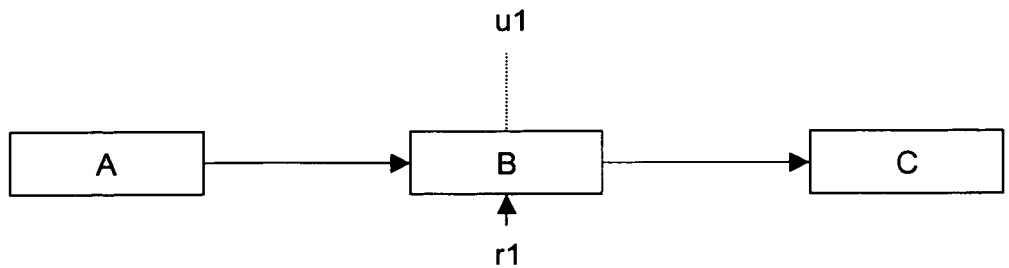
FIGS. 2A-2C are diagrammatic representations of a linked list of data elements undergoing a data element deletion according to a conventional read-copy update mechanism.
Figure 2B:
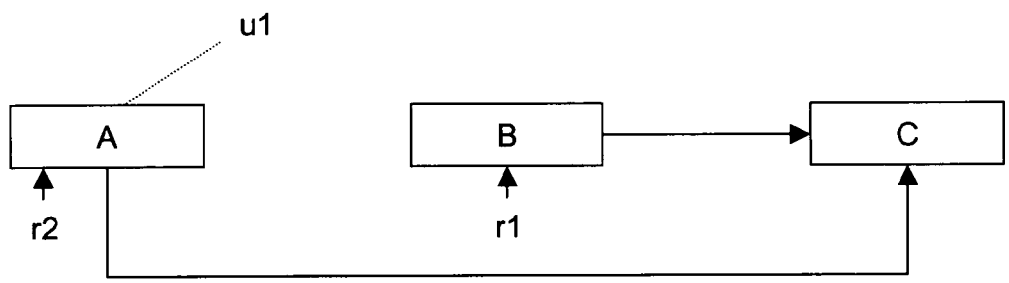
Figure 2C:
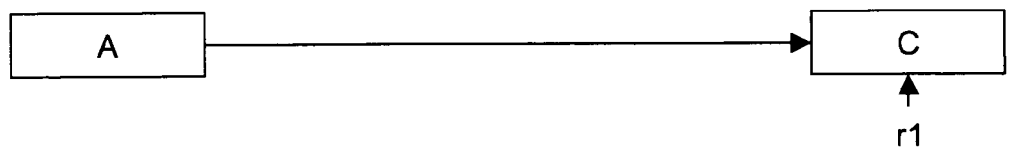
Figure 3:
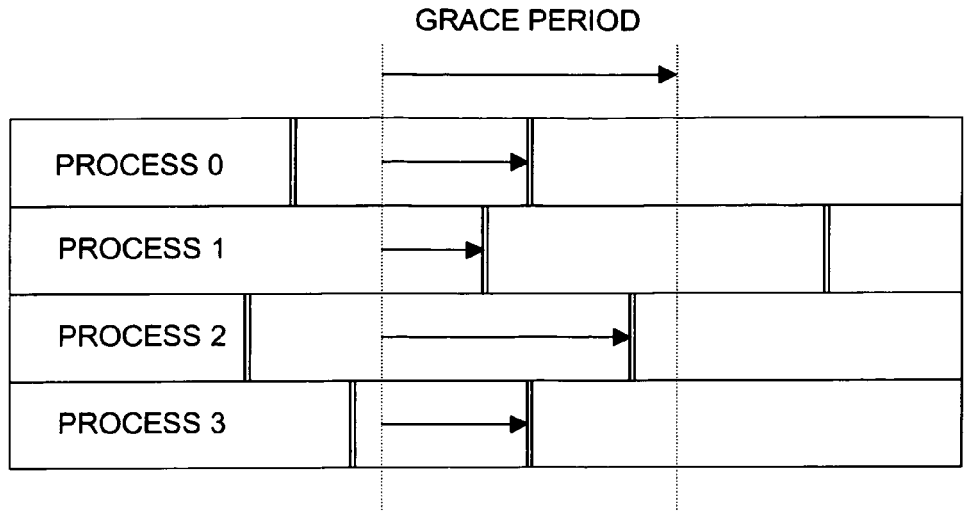
FIG. 3 is a flow diagram illustrating a grace period in which four processes pass through a quiescent state.
Figure 4:
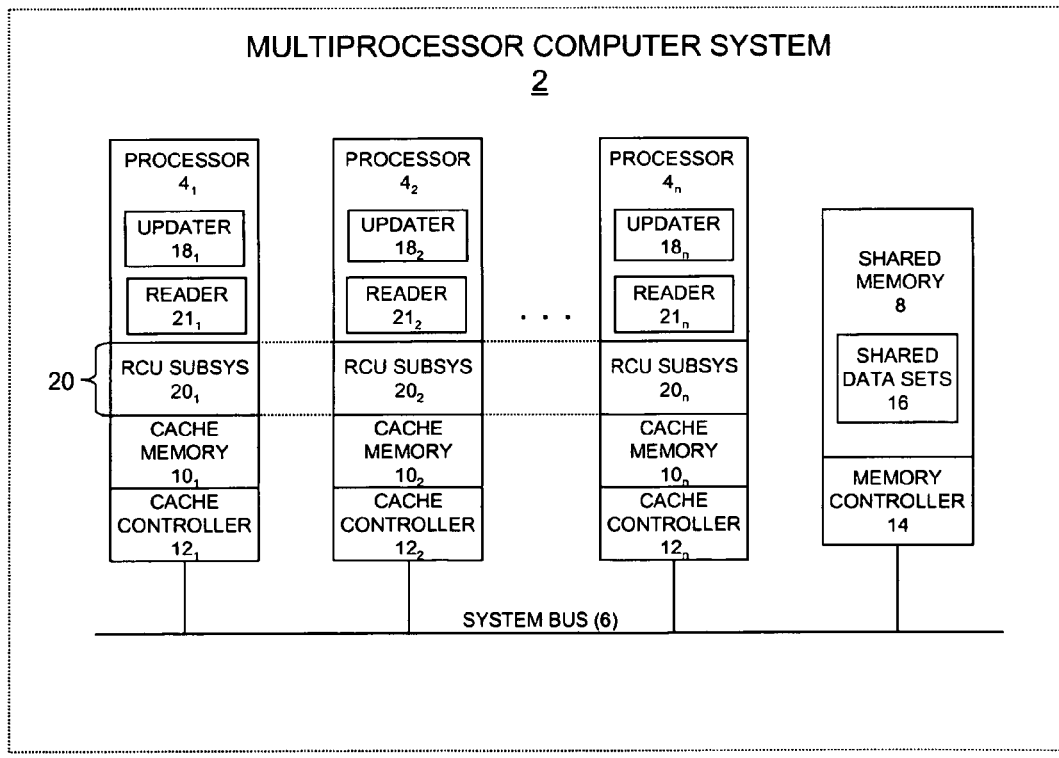
FIG. 4 is a functional block diagram showing a multiprocessor computing system that represents an exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used to implement the invention.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their operating system functions. Each of the processors $4_1, 4_2 \ldots 4_n$ also periodically execute read operations (readers) $21_1, 21_2 \ldots 21_n$ on the shared data 16. Such read operations will typically be performed far more often than updates, insofar as this is one of the premises underlying the use of read-copy update.

Running the RCU subsystem 20 in operating system kernel mode is consistent with many existing read-copy update implementations. However, as described in more detail below, instead of relying on traditional kernel-based notions of quiescent states (such as context switches), an alternative technique is used to detect grace periods that is compatible with realtime preemption requirements. A further consequence of using the grace period detection technique disclosed herein is that it allows the RCU subsystem 20 to be implemented in user mode. In the past, one drawback of user mode read-copy update was that a user application had to define special quiescent states that are analogous to a context switch in an operating system kernel. However, the present invention provides the required grace period detection processing and thus obviates the need for an application to implement its own special quiescent state definitions.

Figure 5:
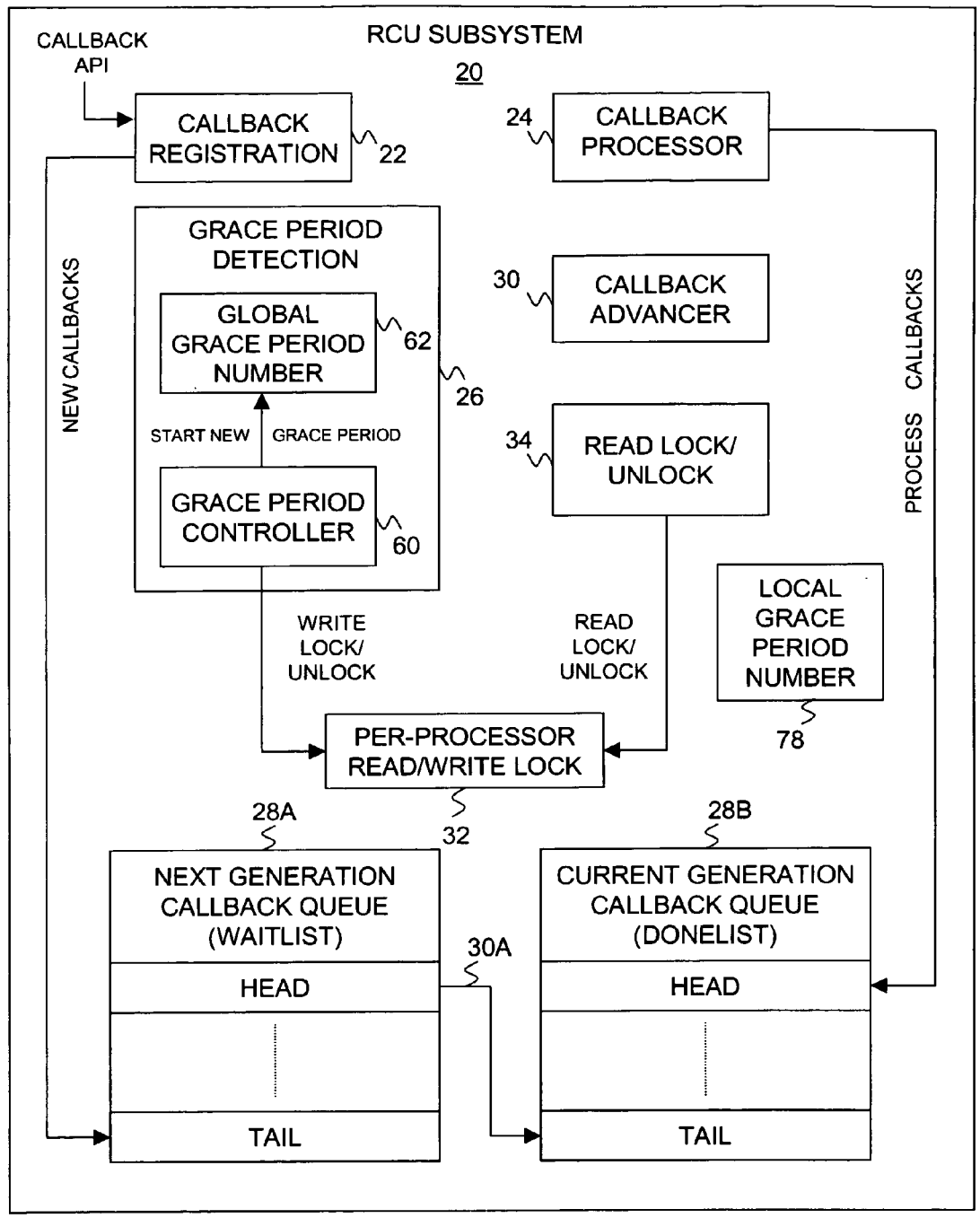
FIG. 5 is a functional block diagram showing a read-copy update subsystem implemented in the computing system of FIG. 4.

As shown in FIG. 5, the RCU subsystem 20 includes a callback registration component 22. The callback registration component 22 serves as an API (Application Program Interface) to the RCU subsystem 20 that can be called by the updaters $18_2 \ldots 18_n$ to register requests for deferred (second phase) data element updates following initial (first phase) updates performed by the updaters themselves. As is known in the art, these deferred update requests involve the destruction of stale data elements, and will be handled as callbacks within the RCU subsystem 20. A callback processing component 24 within the RCU subsystem 20 is responsible for executing the callbacks, then removing the callbacks as they are processed. A grace period detection component 26 determines when a grace period has expired so that the callback processing system 24 can execute a new generation of callbacks.

The read-copy update subsystem 20 also maintains a set of callback queues 28A and 28B that are manipulated by a callback advancer 30. Although the callback queues 28A/28B can be implemented using a shared global array that tracks callbacks registered by each of the updaters $18_1, 18_2 \ldots 18_n$, improved scalability can be obtained if each read-copy update subsystem instance $20_1, 20_2 \ldots 20_n$ maintains its own pair of callback queues 28A/28B in a corresponding one of the cache memories $10_1, 10_2 \ldots 10_n$. Maintaining per-processor versions of the callback queues 28A/28B in the local caches $10_1, 10_2 \ldots 10_n$ reduces memory latency. Regardless of which implementation is used, the callback queue 28A, referred to as the "Next Generation" or "Waitlist" queue, will be appended (or prepended) with new callbacks by the callback registration component 22 as such callbacks are registered. All callbacks registered on the callback queue 28A will not become eligible for grace period processing until the end of the next grace period that follows the current grace period. The callback queue 28B, referred to as the "Current Generation" or "Donelist" queue, maintains the callbacks that are eligible for processing at the end of the current grace period. As stated above, the grace period processing component 24 is responsible for executing the callbacks referenced on the callback queue set 28, and for removing the callbacks therefrom as they are processed. The callback advancer 30 is responsible for moving the callbacks on the Next Generation callback queue 28A to the end of the Current Generation callback queue 28B after a new grace period is started. The arrow labeled 30A in FIG. 5 illustrates this operation.

The reason why new callbacks are not eligible for processing and cannot be placed on the Current Generation callback queue 28B becomes apparent if it is recalled that a grace period represents a time frame in which all processors have passed through at least one quiescent state. If a callback has been pending since the beginning of a grace period, it is guaranteed that no processor will maintain a reference to the data element associated with the callback at the end of the grace period. On the other hand, if a callback was registered after the beginning of the current grace period, there is no guarantee that all processors potentially affected by this callback's update operation will have passed through a quiescent state.

In non-realtime computing environments, grace period detection can be conventionally based on each of the processors $4_1, 4_2 \ldots 4_n$ passing through a quiescent state that typically arises from a context switch. However, as described by way of background above, if the processors $4_1, 4_2 \ldots 4_n$ are programmed to run a preemptable realtime operating system, an executing task, such as any of the readers $21_1, 21_2 \ldots 21_n$, can be preempted by a higher priority task. Such preemption can occur even while the readers $21_1, 21_2 \ldots 21_n$ are in a critical section referencing elements of the shared data 16 (shared data elements). In order to prevent premature grace period detection and callback processing, a technique is needed whereby the readers $21_1, 21_2 \ldots 21_n$ can advise the RCU subsystem 20 that they are performing critical section processing. Although one solution would be to suppress preemption across read-side critical sections, this approach can degrade realtime response latency.

As shown in FIG. 5, one way to prevent premature grace period detection without suppressing preemption is to assign a read/write lock 32 to each processor $4_1, 4_2 \ldots 4_n$, that the readers $21_1, 21_2 \ldots 21_n$ can acquire when accessing the shared data 16, and then release when read processing has completed. Premature callback processing can then be ensured by requiring the RCU subsystem 20 to acquire the write side of each processor's reader/writer lock 32 before starting a new grace period and performing the callback queue manipulations described above.

As persons skilled in the art will appreciate, a read/write lock is a synchronization mechanism that allows concurrent read access to an object but requires exclusive access for write operations. As a result of conventional operations of the cache controllers $12_1, 12_2 \ldots 12_n$, the per-processor read/write lock 32 of FIG. 5 will tend to be maintained in the cache memories $10_1, 10_2 \ldots 10_n$ of their associated processors $4_1, 4_2 \ldots 4_n$, such that read/write lock access latency is minimized during reading. Acquiring each of the read/write locks 32 for writing is more time consuming, but this overhead can be justified when it is considered that new grace periods are started much less frequently than read operations.

Figure 6:
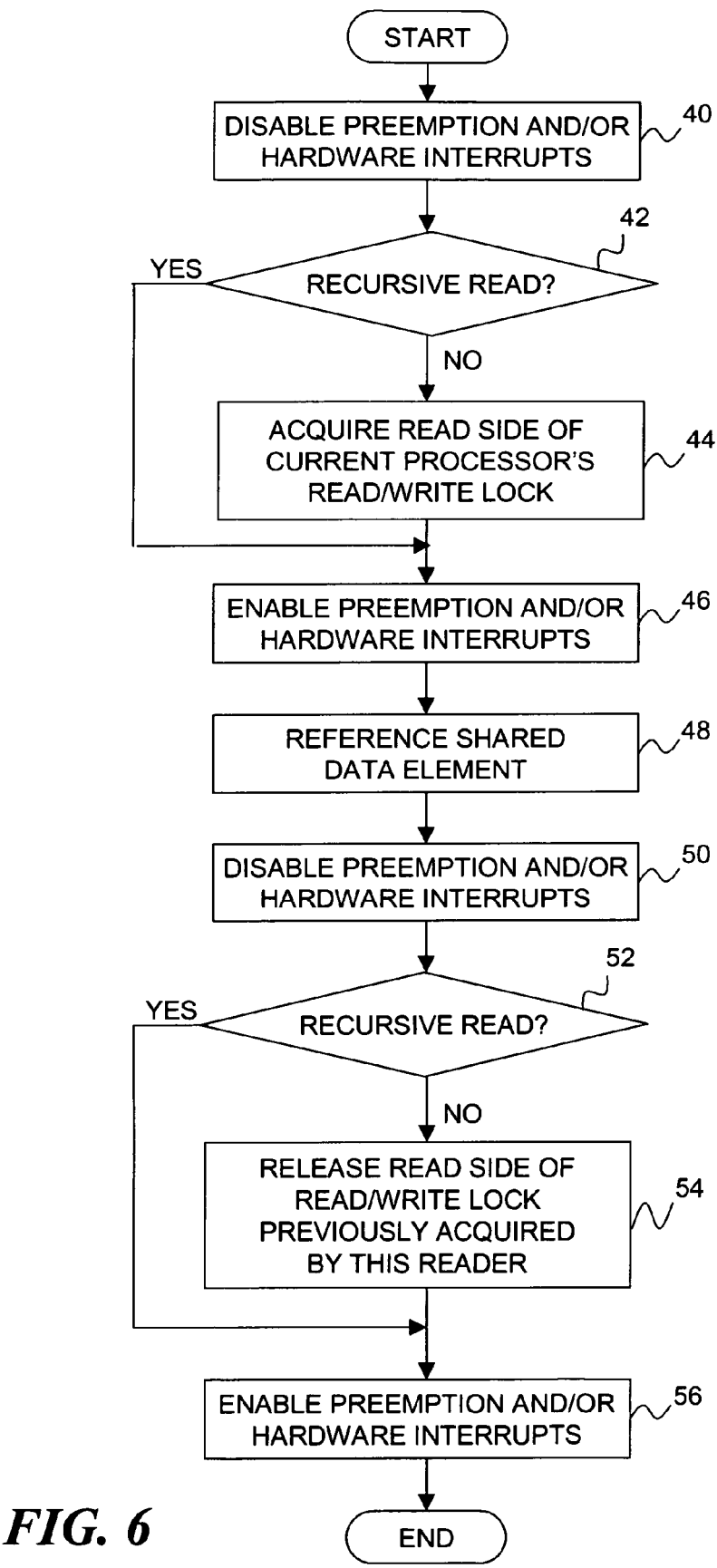
FIG. 6 is a flow diagram showing read processing that may be performed by the read-copy update subsystem of FIG. 5.

In FIG. 5, the RCU subsystem 20 is provided with a read lock/unlock component 34 that the readers $21_1, 21_2 \ldots 21_n$ can invoke in order to manipulate an associated one of the read/write locks 32 during read operations. A reader 21 and the read lock/unlock component 34 may cooperate during read processing in accordance with the flow diagram of FIG. 6. Initially, the reader 21 invokes the read lock/unlock component 34 in order to acquire the current processor's read/write lock 32 for reading. The read lock/unlock component 34 implements step 40 and disables preemption and/or hardware interrupts to prevent preemption and/or reentrant OS-level interrupt processing during lock manipulation, which is relatively brief. In step 42, the read lock/unlock component 34 tests whether or not the current read operation is recursive. By way of example, a recursive read operation can arise when nested data structures are accessed (e.g., an RCU-protected list pointed to by another RCU-protected list). Another scenario is when an interrupt occurs while a process is performing a read operation on RCU-protected data, and the interrupt service routine also performs a read operation on RCU-protected data. When such recursion occurs, it is not necessary to perform read/write lock manipulation insofar as the read operations are nested and lock manipulation by the outermost read operation will necessarily prevent premature callback processing for both itself and the recursive read operations.

If the current read operation is determined in step 42 to be recursive, no read/write lock manipulation is required. Step 46 is implemented and the read lock/unlock component 34 re-enables preemption and/or hardware interrupts, and returns control to the reader 21. If the current read operation is non-recursive, processing proceeds to step 44. The read lock/unlock component 34 obtains a reference to the read/write lock 32 that is associated with the processor 4 on which the reader 21 is executing, then acquires the read/write lock 32 for reading. After performing step 46 to re-enable preemption and/or hardware interrupts, control is returned to the reader 21 so that the latter can reference the shared data 10 in step 48. Following the data read operation, the reader 21 invokes the read lock/unlock component 34 in order to release the previously acquired read/write lock 32. In step 50, the read lock/unlock component 34 disables preemption and/or hardware interrupts. In step 52, the read lock/unlock component 34 tests whether or not the current read operation is recursive. If it is, step 56 is invoked to re-enable preemption and/or hardware interrupts and return control to the reader 21. If the current read operation is determined not to be recursive in step 52, the read lock/unlock component 34 implements step 54 to release the read/write lock 32 that was acquired in step 44. In order to ensure that the correct version of the read/write lock 32 is released in the event that steps 52-56 are executed on a different processor 4 than the one that executed steps 40-46, the reference (e.g., a pointer) to the read/write lock 32 obtained in step 44 can be maintained in the reader's task structure.

Figure 7:
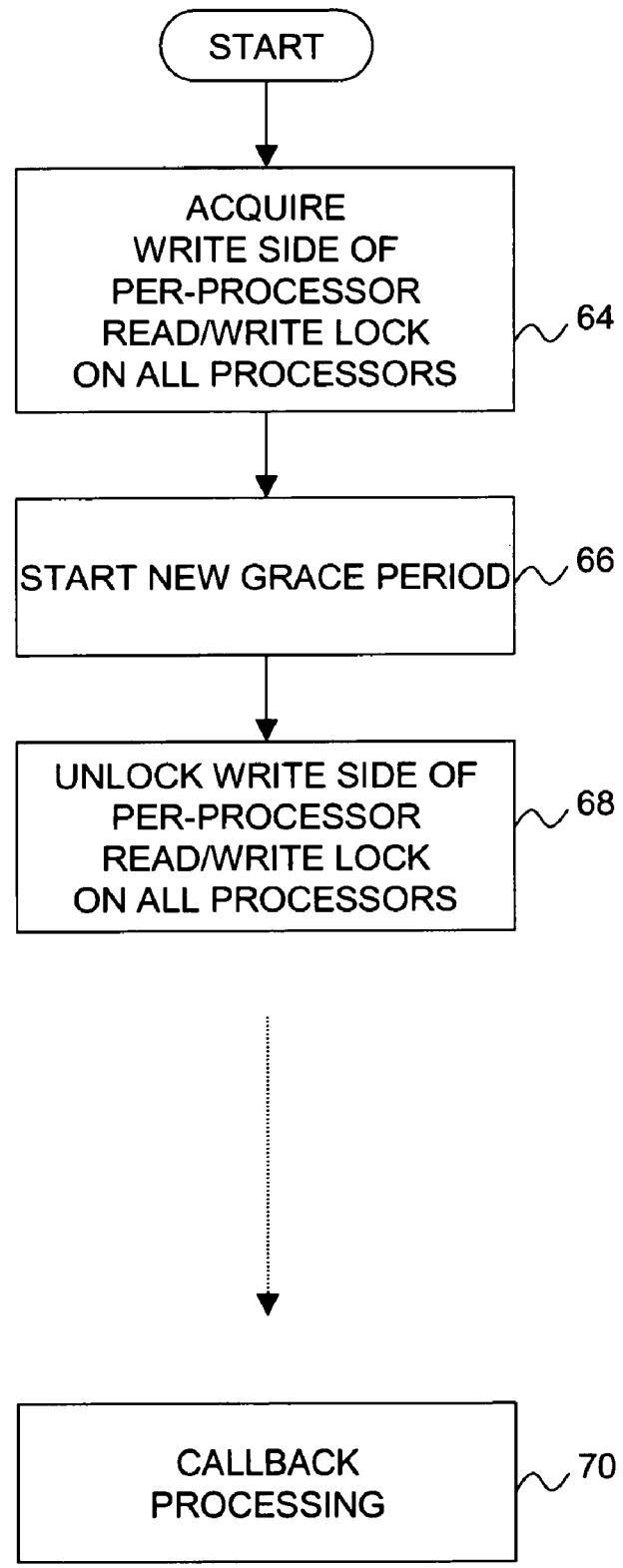
FIG. 7 is a flow diagram showing grace period control and callback processing that may be performed by the read-copy update subsystem of FIG. 5.

As previously stated, the RCU subsystem 20 of FIG. 5 must acquire each of the per-processor read/write locks 32 before starting a new grace period. This processing can be performed by a grace period controller 60 that manipulates the write side of each read/write lock 32, and which manipulates a global grace period number 62 to start new grace periods. FIG. 7 illustrates exemplary processing steps that may be performed by the grace period controller 60 to implement realtime-safe grace period detection. Beginning in step 64, the grace period controller 60 acquires the write side of each read/write lock 32. Once all such locks are acquired, and it is thus ensured that no readers 21 are within critical sections, the grace period controller 60 starts a new grace period by incrementing the global grace period number 62. If the read/write locks 32 cannot be acquired in step 64, the grace period controller 60 can terminate the current attempt and re-attempt lock acquisition during its next invocation. In step 68, the grace period controller 60 releases all of the read/write locks 32. Thereafter, the callback processor 24 may be invoked to perform callback processing in step 70 (e.g., from a kernel daemon, a work queue, etc.). The callbacks may be invoked at any desired rate and pace, depending on realtime requirements, etc.

Figure 8:
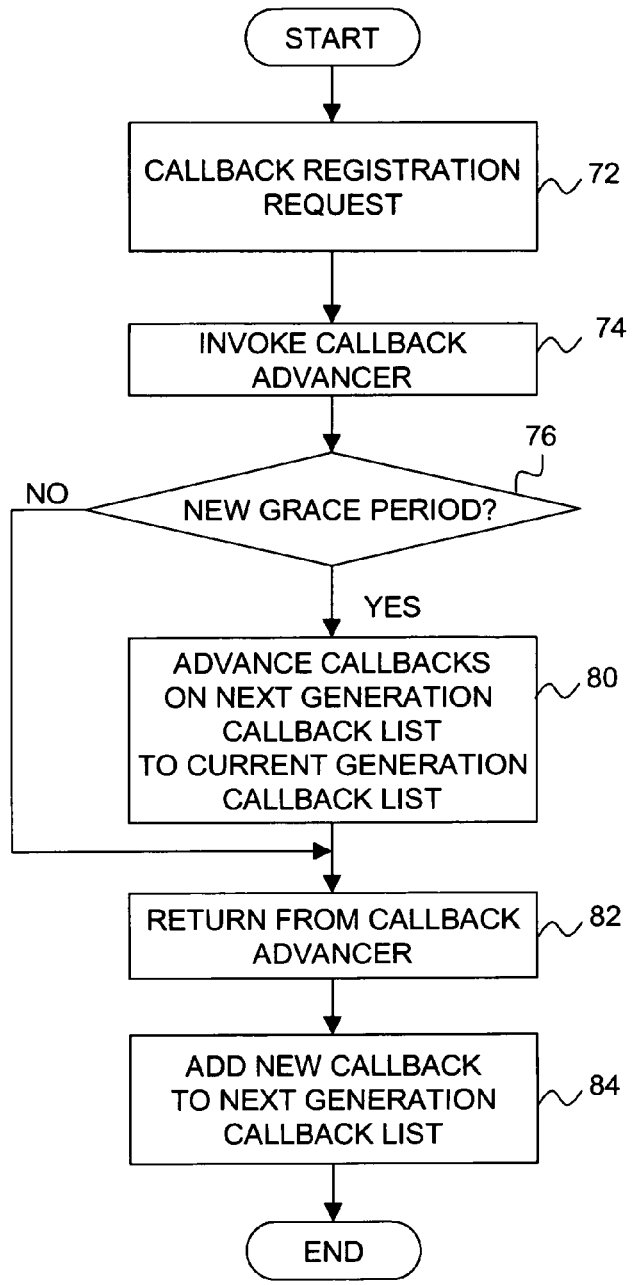
FIG. 8 is a flow diagram showing callback registration and advancement processing that may be performed by the read-copy update subsystem of FIG. 5.
Figure 9:
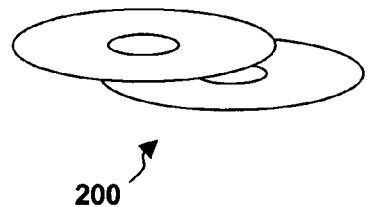
FIG. 9 is a diagrammatic illustration of media that can be used to provide a computer program product for implementing read-copy update processing in a realtime-safe manner in accordance with the invention.

FIG. 8 illustrates exemplary processing that may be performed by the callback registration component 22 and the callback advancer 30 to manage callbacks on the callback queues 28A/28B according to the global grace period number. In step 72, a callback registration request is made to the callback registration component 22. In step 74, the callback registration component 22 invokes the callback advancer 30 to advance the callbacks on the callback queues 28A/28B, if possible. In step 76, the callback advancer 30 tests to see if a new grace period has started. This can be done by comparing the global grace period number 62 against a local grace period number 78 (FIG. 5) associated with the callback queues 28A/28B. If the callback queues 28A/28B are per-processor queues, the local grace period number 78 will be a per-processor variable that tends to be cached in each processor's cache memory 10. If the global grace period number 62 is equal to the local grace period number 78, a new grace period will not have started. The result of step 76 will be false and the control will return from the callback advancer to the callback registration component in step 82. If the global grace period number 62 is greater than the local grace period number 78, a new grace period will have been started by the grace period controller 60. The result of step 76 will be true and the callback advancer 30 will advance callbacks in step 80 (as described above). After control returns from the callback advancer in step 82, the callback registration component 22 will add a new callback to the Next Generation callback queue 28A in step 84.

Returning now to the grace period controller 60 (FIG. 5) and the above-described lock-based synchronization technique for starting new grace periods, there are various options for controlling the rate of acquisition of the write side of each read/write lock 32. Such options include, but are not necessarily limited to:

1) The passage of time (e.g., every scheduling clock interrupt, every other scheduling clock interrupt, etc.);
2) Memory pressure (e.g., if under memory pressure, acquire more frequently);
3) Number of callbacks waiting on a given processor;
4) Number of callbacks waiting globally;
5) Amount of memory being deferred by callbacks waiting on a given processor;
6) Amount of memory being deferred by callbacks globally;
7) Some combination of the above.

It should also be understood that the present invention could be implemented in an environment that does not utilize the callback queue manipulation processing described above. Thus, instead of placing callbacks on a list, the write side of the read/write locks 32 could be acquired on every invocation of the callback registration component 22 by the updaters $18_1$, $18_2 \ldots 18_n$. This, however, would impose considerable per-update overhead, and thus should be reserved for extremely read-intensive workloads or situations having extreme memory pressure.

Accordingly, a technique for realtime-safe read-copy update processing has been disclosed that allows readers to access shared data on a lock-free basis. It will be appreciated that the foregoing concepts may be variously embodied in any of a data processing system, a machine implemented method, and a computer program product in which programming means are provided by one or more machine-readable media for use in controlling a data processing system to perform the required functions. Exemplary machine-readable media for providing such programming means are shown by reference numeral 200 in FIG. 15. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium or signal, or other entity that can contain, store, communicate, propagate or transport the programming means for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for realtime-safe detection of a grace period for deferring the destruction of a shared data element until pre-existing references to the data element are removed, comprising:
    establishing a read/write lock for each of one or more processors;
    when reading a shared data element at a processor:
        acquiring said processor's read/write lock for reading;
        referencing said shared data element; and
        releasing said read/write lock that was acquired for reading; and
    when starting a new grace period:
        acquiring all of said read/write locks for writing;
        starting said new grace period; and
        releasing all of said read/write locks.

2. A method in accordance with claim 1 further including:
    following an update to a shared data element in a manner that preserves a pre-update version of said data element and a new request for deferred destruction of said data element;
    testing for the start of a new grace period;
    advancing previous requests for deferred data element destruction to a current generation queue upon a determination that a new grace period has started; and
    placing said new request for deferred destruction on a next generation queue.

3. A method in accordance with claim 2 further including processing the destruction of one or more shared data elements on said current generation queue after starting a new grace period.

4. A method in accordance with claim 1 wherein said reading is performed by an executable task having an associated task structure, and wherein said task structure maintains a reference to said read/write lock that was acquired for reading until release thereof.

5. A method in accordance with claim 1 wherein no acquisition of said read/write lock for reading is performed in the event that said reading is a recursive read operation.

6. A method in accordance with claim 1 wherein said reading comprises disabling preemption and/or hardware interrupts when acquiring and releasing said read/write lock.

7. A method in accordance with claim 1 wherein a rate of acquisition of said read/write locks for writing is determined according to memory availability.

* * * * *